July 28, 1925.
1,547,430
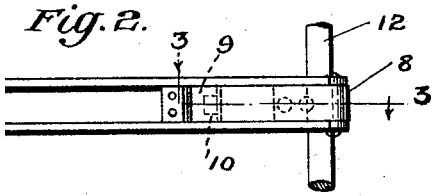
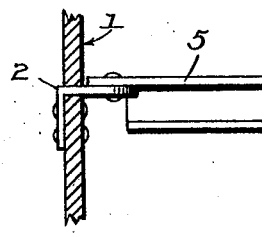
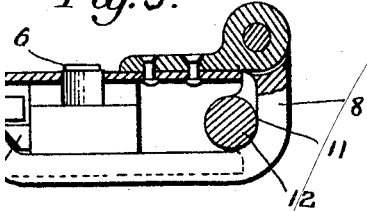
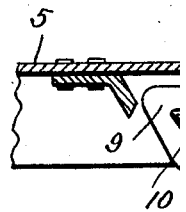
INVENTOR
HUGH F. MCDONALD
BY
ATTORNEY Patented July 28, 1925.

1,547,430

UNITED STATES PATENT OFFICE.

HUGH F. McDONALD, OF SAN FRANCISCO, CALIFORNIA.

AUTOMOBILE SHIFT-LEVER LOCK.

Application filed February 13, 1924. Serial No. 692,487.

*To all whom it may concern:*

Be it known that I, HUGH F. MCDONALD, a citizen of the United States, and a resident of the city and county of San Francisco and State of California, have invented certain new and useful Improvements in Automobile Shift-Lever Locks, of which the following is a specification.

The present invention relates to improvements in automobile shift-lever locks, and has for a principal object the provision of a simple means for locking and preventing the operation of automobiles by unauthorized persons.

The invention comprises elements and certain improvements and combinations of parts adapted to engage and lock against movement the shift-levers of automobiles thereby preventing a controlled operation of the machine.

In the accompanying drawings, forming a part of this specification, and in which similar characters of reference refer to like parts, throughout, Figure 1 is a plan view of my invention showing it as secured to the front of an automobile's seat and in locked position about the shift-lever, the dotted-in member representing the position of the pivotally borne locking-arm when thrown out of the locked position; Figure 2 is a side elevation, and Figure 3 is an enlarged detail on line 3—3 of Figure 2.

Referring more particularly to the drawings, 1 represents a section of the driver's seat of an automobile, to which is secured a bracket 2 bearing a hinged member comprised of a channeled bar 5 having a shift-lever seat in its outer end and provided with a recessed lock 6 and a pivotally attached arm 8 fashioned to embrace, in connection with said seat, a shift-lever 12 and enter into locked engagement with the bolt 10, through its hasp-like extremity 9, upon being brought into locking relationship with said shift-lever.

Normally when out of service, the device may be made to occupy a recessed position in the seat's front, not shown, from which it is swung to encircle the shift-lever, automatically locking itself thereabout and from which a key is necessary for its release, after which, it may be returned to its recess.

Having thus described my invention, I claim, and desire to secure by Letters Patent:

In an automobile shift-lever lock, the combination, with an automobile-body section and a shift-lever, of a bracket rigidly secured to said body section, a hinged member borne by said bracket and comprising a channeled bar having a seat at its free end adapted to receive and seat said shift-lever, an arm pivotally attached to the end of said channeled bar and having a rearwardly extending section ending in a hasp, said arm being fashioned to embrace the shift-lever, in connection with the said shift-lever seat of the channeled bar, the said channeled bar being provided with a recessed lock having a spring bolt adapted to engage said hasp, said lock being so positioned between the flanges of the channeled bar as to be flush, when in locked position, with the outer edges of said flanges and fully protected and secured against tampering therewith.

HUGH F. McDONALD.